(12) United States Patent
Högstedt et al.

(10) Patent No.: US 11,493,765 B2
(45) Date of Patent: Nov. 8, 2022

(54) IMAGE RELAY SYSTEMS AND METHODS FOR WEARABLE APPARATUSES

(71) Applicant: FLIR Systems AB, Täby (SE)

(72) Inventors: Christian Högstedt, Nacka (SE); Anton Hoffman, Bromma (SE)

(73) Assignee: FLIR Systems AB, Täby (SE)

( * ) Notice: Subject to any disclaimer, the term of this patent is extended or adjusted under 35 U.S.C. 154(b) by 87 days.

(21) Appl. No.: 16/899,330

(22) Filed: Jun. 11, 2020

(65) Prior Publication Data

US 2020/0393680 A1   Dec. 17, 2020

Related U.S. Application Data

(60) Provisional application No. 62/861,977, filed on Jun. 14, 2019.

(51) Int. Cl.
| | |
|---|---|
| *G02B 27/01* | (2006.01) |
| *H04N 5/33* | (2006.01) |
| *G06F 1/16* | (2006.01) |
| *G01J 5/08* | (2022.01) |
| *G01J 5/02* | (2022.01) |
| *G01J 5/00* | (2022.01) |

(52) U.S. Cl.
CPC ........ *G02B 27/0172* (2013.01); *G01J 5/0265* (2013.01); *G01J 5/0853* (2013.01); *G02B 27/0101* (2013.01); *G06F 1/163* (2013.01); *H04N 5/332* (2013.01); *G01J 2005/0077* (2013.01); *G02B 2027/014* (2013.01); *G02B 2027/0138* (2013.01); *G02B 2027/0174* (2013.01)

(58) Field of Classification Search
CPC .... G01J 2005/0077; G01J 5/0265; G01J 5/04; G01J 5/0853; G02B 2027/0138; G02B 2027/014; G02B 2027/0174; G02B 23/12; G02B 27/01; G02B 27/0101; G02B 27/0172; G06F 1/163; H04N 5/332
See application file for complete search history.

(56) References Cited

U.S. PATENT DOCUMENTS

| | | | | |
|---|---|---|---|---|
| 289,642 | A | * 12/1883 | Giles | ...................... G04B 43/00 |
| | | | | 368/293 |
| 3,059,519 | A | * 10/1962 | Stanton | .................. A42B 3/042 |
| | | | | 359/482 |

(Continued)

*Primary Examiner* — Dmitriy Bolotin
(74) *Attorney, Agent, or Firm* — Haynes and Boone, LLP

(57) ABSTRACT

Techniques are disclosed for facilitating image relay for wearable devices with thermal imaging devices attached thereto. In one example, a system includes an attachment configured to releasably couple to an exterior surface of a wearable apparatus. The attachment includes an infrared sensor assembly configured to capture a thermal image of a scene. The attachment further includes a display component configured to provide data indicative of the thermal image. The system further includes an optical relay component configured to couple to an interior surface of the wearable apparatus. The optical relay component is further configured to receive the data from the display component and relay the data within the wearable apparatus to facilitate presenting the data for viewing by a user while wearing the wearable apparatus. Related devices and methods are also provided.

20 Claims, 8 Drawing Sheets

(56) References Cited

U.S. PATENT DOCUMENTS

| | | | | |
|---|---|---|---|---|
| 4,156,292 A * | 5/1979 | Helm | | A42B 3/042 |
| | | | | 2/422 |
| D559,250 S * | 1/2008 | Pombo | | D14/372 |
| 7,369,174 B2 * | 5/2008 | Olita | | G02B 27/0176 |
| | | | | 348/373 |
| 7,460,304 B1 * | 12/2008 | Epstein | | A62B 18/082 |
| | | | | 2/6.3 |
| 8,191,846 B2 * | 6/2012 | Bresolin | | A01K 63/006 |
| | | | | 248/309.4 |
| D700,928 S * | 3/2014 | Lavoie | | D16/309 |
| D700,962 S * | 3/2014 | Lavoie | | D24/110.2 |
| D704,327 S * | 5/2014 | Lavoie | | D24/110.2 |
| D704,328 S * | 5/2014 | Lavoie | | D24/110.2 |
| D706,414 S * | 6/2014 | Lavoie | | D24/110.2 |
| D720,632 S * | 1/2015 | Lavoie | | D10/49 |
| D737,955 S * | 9/2015 | Lavoie | | D24/110.2 |
| 9,500,868 B2 * | 11/2016 | Dopilka | | G02B 27/0172 |
| 9,998,687 B2 * | 6/2018 | Lavoie | | G02B 27/017 |
| 10,417,497 B1 * | 9/2019 | Cossman | | H04L 67/12 |
| 10,896,492 B2 * | 1/2021 | Long, II | | H04N 5/33 |
| 2001/0049837 A1 * | 12/2001 | Slack | | A62B 18/04 |
| | | | | 2/6.2 |
| 2002/0092522 A1 * | 7/2002 | Fabin | | A62B 18/084 |
| | | | | 128/201.23 |
| 2003/0122958 A1 * | 7/2003 | Olita | | G02B 27/0176 |
| | | | | 348/373 |
| 2006/0090278 A1 * | 5/2006 | Hang | | A01K 63/10 |
| | | | | 15/220.2 |
| 2008/0210835 A1 * | 9/2008 | Bagnall | | F16L 3/13 |
| | | | | 248/206.5 |
| 2014/0071294 A1 * | 3/2014 | Lavoie | | G02B 23/125 |
| | | | | 348/164 |
| 2016/0124227 A1 * | 5/2016 | Zhang | | G02B 27/0176 |
| | | | | 345/8 |
| 2017/0130321 A1 * | 5/2017 | Mizumura | | C25D 5/022 |
| 2020/0132463 A1 * | 4/2020 | Gauthier | | G01C 21/165 |
| 2020/0147418 A1 * | 5/2020 | Haciomeroglu | | A62B 18/082 |
| 2020/0151859 A1 * | 5/2020 | Long, II | | H04N 5/33 |

* cited by examiner

IMAGE RELAY SYSTEMS AND METHODS FOR WEARABLE APPARATUSES

CROSS REFERENCE TO RELATED APPLICATIONS

This application claims the benefit of and priority to U.S. Provisional Patent Application No. 62/861,977 filed Jun. 14, 2019 and entitled "IMAGE RELAY SYSTEMS AND METHODS FOR WEARABLE APPARATUSES," which is incorporated herein by reference in its entirety.

TECHNICAL FIELD

One or more embodiments relate generally to imaging devices and more particularly, for example, to image relay systems and methods for wearable apparatuses with thermal imaging devices attached thereto.

BACKGROUND

Various wearable devices have been developed to protect users while in hazardous environments. For example, self-contained breathing apparatus (SCBA) devices are widely utilized by firefighters and other emergency personnel to supply breathable air, as well as to protect their facial areas from heat, flames, debris, and other harmful elements when working in hazardous environments. In another example, welding masks are worn by welders to protect their facial areas from intense light, heat, sparks, and other harmful elements that may be generated during welding.

SUMMARY

In one or more embodiments, a system includes an attachment configured to releasably couple to an exterior surface of a wearable apparatus. The attachment includes an infrared sensor assembly configured to capture a thermal image of a scene. The attachment further includes a display component configured to provide data indicative of the thermal image. The system further includes an optical relay component configured to couple to an interior surface of the wearable apparatus. The optical relay component is further configured to receive the data from the display component and relay the data within the wearable apparatus to facilitate presenting the data for viewing by a user while wearing the wearable apparatus.

In one or more embodiments, the system further includes the wearable apparatus. A method of constructing the system includes releasably coupling the attachment to the exterior surface of the wearable apparatus using one or more first engagement elements. The method further includes coupling the optical relay component to the interior surface of the wearable apparatus using one or more second engagement elements.

In one or more embodiments, a method includes capturing, by an infrared sensor assembly of an attachment that is releasably coupled to an exterior of a wearable apparatus, a thermal image of a scene. The method further includes providing, by a display component of the attachment, data indicative of the thermal image into the wearable apparatus. The method further includes receiving, by an optical relay component coupled to an interior surface of the wearable apparatus, the data, and relaying, by the optical relay component, the data within the wearable apparatus to facilitate presenting the data for viewing by a user while wearing the wearable apparatus The scope of the disclosure is defined by the claims, which are incorporated into this section by reference. A more complete understanding of embodiments of the disclosure will be afforded to those skilled in the art, as well as a realization of additional advantages thereof, by a consideration of the following detailed description of one or more embodiments. Reference will be made to the appended sheets of drawings that will first be described briefly.

Figure 1:
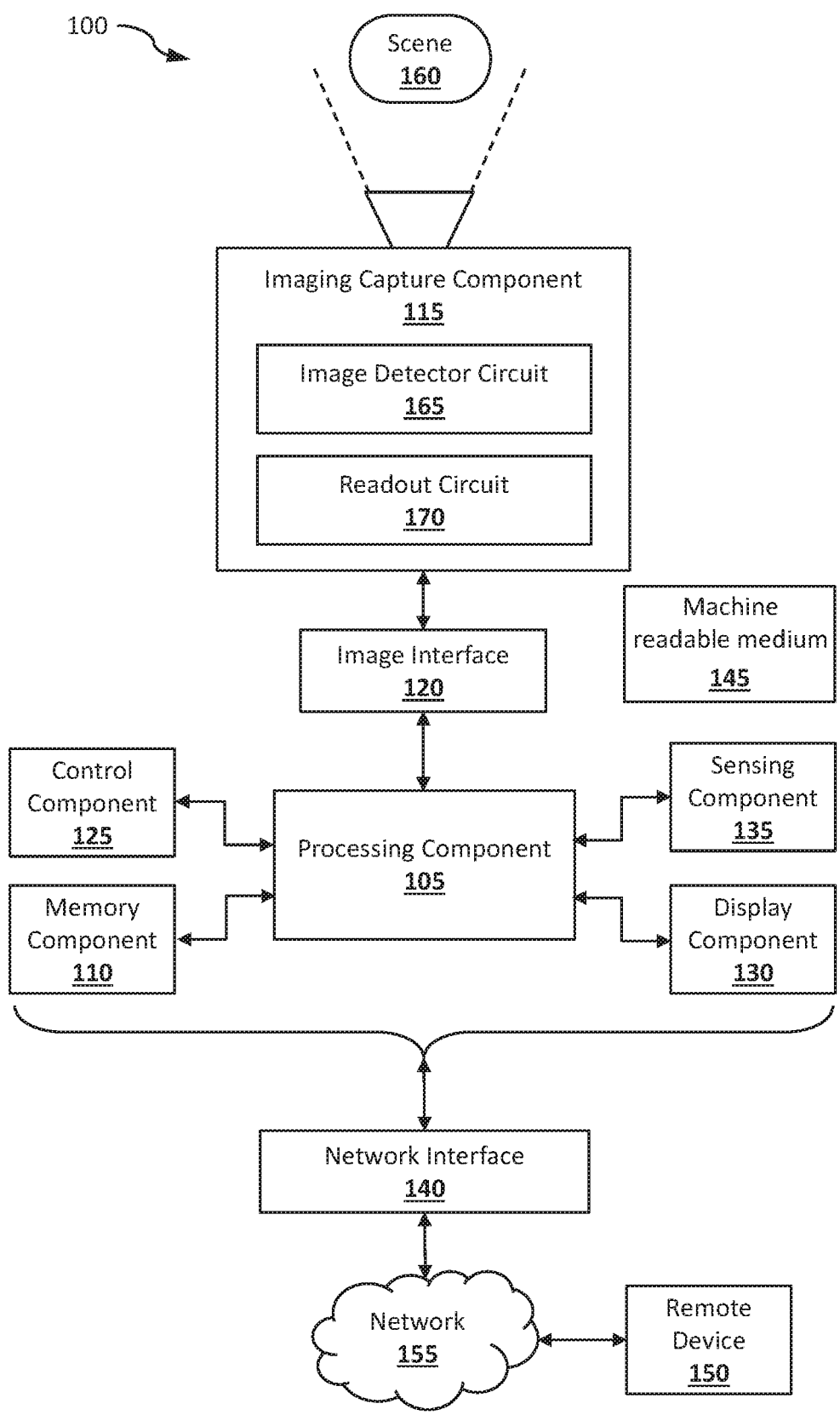
FIG. 1 illustrates a block diagram of an example imaging system in accordance with one or more embodiments of the present disclosure.

Embodiments of the present disclosure and their advantages are best understood by referring to the detailed description that follows. It is noted that sizes of various components and distances between these components are not drawn to scale in the figures. It should be appreciated that like reference numerals are used to identify like elements illustrated in one or more of the figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Various embodiments of methods and systems disclosed herein may be used to facilitate providing of images from a display component of an attachment external to a wearable apparatus into an interior of the wearable apparatus. The display component may provide (e.g., direct, project, present) the images to an optical relay component that is in the interior of the wearable apparatus. The optical relay component, in turn, provides (e.g., directs, projects, presents) the images to a wearer (e.g., also referred to as a user) of the wearable apparatus. The attachment and the optical relay component may be coupled (e.g., attached, engaged, connected) to an exterior surface and an interior surface, respectively, of the wearable apparatus using one or more respective engagement elements. In some cases, the attachment is releasably coupled (e.g., releasably attached) to the exterior surface of the wearable apparatus, and/or the optical relay component is releasably or permanently coupled (e.g., releasably or permanently attached) to the interior surface of the wearable apparatus. The engagement element(s) may include metal, magnets, adhesives (e.g., glue, tape), screws, bolts, pop rivets, bumps and ridges, suction cups, and/or generally any fasteners and/or fastening structure that can securely couple the attachment and the optical relay component to the wearable apparatus.

The attachment may include a housing and an imaging capture component at least partially within the housing. The imaging capture component may capture an image of a scene (e.g., an environment external to the wearable apparatus). The display component may provide the image or a processed version thereof to an interior of the wearable apparatus to facilitate viewing of the image by a user while the user is wearing the wearable apparatus. In an aspect, the imaging device may be an infrared (IR) image (e.g., thermal image), and the IR image may be processed (e.g., by the imaging capture component and/or a processing component of the attachment) to obtain a user-viewable IR image. In this aspect, the user-viewable IR image may be provided by the display component to the optical relay component, and the optical relay component provides the user-viewable IR image for viewing by the user. A user-viewable IR image may be a visible-light representation of IR radiation captured in the IR image. For instance, the user-viewable IR image may be a thermogram. In an aspect, different colors in the user-viewable IR image may be associated with different temperatures. An association between a color and a temperature may be defined using a color palette. A color palette to be used is generally application-specific. In one example color palette, brighter colors (e.g., red, orange, yellow) may indicate warmer temperatures whereas darker colors (e.g., purple, blue) may indicate cooler temperatures.

As such, the optical relay component and the display component collectively mirror an image from the display component into the interior of the wearable apparatus to facilitate viewing of the image by the wearer of the wearable apparatus. In some embodiments, the optical relay component and the display component may be referred to as providing a divided eyepiece system, in which a portion of the eyepiece is provided external to the wearable apparatus by the display component and a remaining portion of the eyepiece is provided internal to the wearable apparatus by the optical relay component. In some cases, the display component and the optical relay component are separated by a shield of the wearable apparatus or otherwise separated by any portion of the wearable apparatus positioned between the user (e.g., the eyes of the user) and an external environment.

The dividing of the eyepiece may allow the attachment and the optical relay component to be utilized for wearable apparatuses of various sizes, including wearable apparatuses of smaller sizes that generally have little or no space inside the wearable apparatus to contain imaging and/or display components. In this regard, the dividing of the eyepiece may allow less space inside the wearable apparatus to be needed to accommodate the eyepiece (e.g., relative to a case in which an entirety of the eyepiece is inside the wearable apparatus), and accordingly allow more flexibility in positioning the display component and/or the optical relay component to facilitate viewing of an image by the user. Embodiments described herein may allow providing of an image as close as desired/possible to the eyes of the user, which may be desired in first responder applications (e.g., firefighting application). In some embodiments, such a divided architecture allows electronic components associated with imaging to be positioned exterior to the wearable apparatus whereas the optical relay component (e.g., a non-electronic component) is positioned interior to the wearable apparatus. In an aspect, all electronic components may be outside an air seal (e.g., encapsulation zones).

Using various embodiments, the attachment for imaging the scene and the optical relay component for providing captured images and/or processed images of the scene to the user wearing the wearable apparatus can be provided while maintaining a design of the wearable apparatus. In this regard, the attachment and the optical relay component may be designed to be compatible with designs of various wearable apparatuses. By maintaining (e.g., not modifying) existing designs of wearable apparatuses, costs associated with designing and manufacturing the wearable apparatuses can be reduced. For wearable apparatuses of various applications, such as first responder equipment, such costs may include time and monetary costs associated with required testing, recertifying, and/or classifying a wearable apparatus for any modification made to their design. By implementing a divided eyepiece system, modifications to the wearable apparatus associated with fitting an entirety of the eyepiece inside the wearable apparatus and/or modifications associated with electronic transfer of data (e.g., image data) to and/or within the wearable apparatus and any associated cabling may be avoided or minimized.

Referring now to the drawings, FIG. 1 illustrates a block diagram of an example imaging system 100 (e.g., an infrared camera) in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

The imaging system 100 may be utilized for capturing and processing images in accordance with an embodiment of the disclosure. The imaging system 100 may represent any type of imaging system that detects one or more ranges (e.g., wavebands) of electromagnetic (EM) radiation and provides representative data (e.g., one or more still image frames or video image frames). The imaging system 100 may include a housing that at least partially encloses components of the imaging system 100, such as to facilitate compactness and protection of the imaging system 100. For example, the solid box labeled 100 in FIG. 1 may represent the housing of the imaging system 100. The housing may contain more, fewer, and/or different components of the imaging system 100 than those depicted within the solid box of FIG. 1. In some cases, rather than a single housing, the imaging system 100 may include multiple housings that each at least partially enclose one or more components of the imaging system 100. Various components of the imaging system 100 may communicate with each other via wired communications and/or wireless communications. In an embodiment, the imaging system 100 may be, may include, or may be a part of an attachment that can be releasably coupled to (e.g., attached to, mounted on, connected to) a wearable apparatus worn by a user to allow images of a scene 160 (e.g., an environment external to the wearable apparatus) to be captured, stored, and/or displayed.

The imaging system 100 includes, according to one implementation, a processing component 105, a memory component 110, an image capture component 115, an image interface 120, a control component 125, a display component 130, a sensing component 135, and a network interface 140. The processing component 105, according to various embodiments, includes one or more of a processor, a microprocessor, a central processing unit (CPU), a graphics processing unit (GPU), a single-core processor, a multi-core processor, a microcontroller, a programmable logic device (PLD) (e.g., field programmable gate array (FPGA)), an application specific integrated circuit (ASIC), a digital signal processing (DSP) device, or other logic device that may be configured, by hardwiring, executing software instructions, or a combination of both, to perform various operations discussed herein for embodiments of the disclosure. The processing component 105 may be configured to interface and communicate with the various other components (e.g., 110, 115, 120, 125, 130, 135, etc.) of the imaging system 100 to perform such operations. For example, the processing component 105 may be configured to process captured image data received from the imaging capture component 115, store the image data in the memory component 110, and/or retrieve stored image data from the memory component 110. In one aspect, the processing component 105 may be configured to perform various system control operations (e.g., to control communications and operations of various components of the imaging system 100) and other image processing operations (e.g., data conversion, video analytics, etc.).

The memory component 110 includes, in one embodiment, one or more memory devices configured to store data and information, including infrared image data and information. The memory component 110 may include one or more various types of memory devices including volatile and non-volatile memory devices, such as random access memory (RAM), dynamic RAM (DRAM), static RAM (SRAM), non-volatile random-access memory (NVRAM), read-only memory (ROM), programmable read-only memory (PROM), erasable programmable read-only memory (EPROM), electrically-erasable programmable read-only memory (EEPROM), flash memory, hard disk drive, and/or other types of memory. As discussed above, the processing component 105 may be configured to execute software instructions stored in the memory component 110 so as to perform method and process steps and/or operations. The processing component 105 and/or the image interface 120 may be configured to store in the memory component 110 images or digital image data captured by the image capture component 115. The processing component 105 may be configured to store processed still and/or video images in the memory component 110.

In some embodiments, a separate machine-readable medium 145 (e.g., a memory, such as a hard drive, a compact disk, a digital video disk, or a flash memory) may store the software instructions and/or configuration data which can be executed or accessed by a computer (e.g., a logic device or processor-based system) to perform various methods and operations, such as methods and operations associated with processing image data. In one aspect, the machine-readable medium 145 may be portable and/or located separate from the imaging system 100, with the stored software instructions and/or data provided to the imaging system 100 by coupling the machine-readable medium 145 to the imaging system 100 and/or by the imaging system 100 downloading (e.g., via a wired link and/or a wireless link) from the machine-readable medium 145. It should be appreciated that various modules may be integrated in software and/or hardware as part of the processing component 105, with code (e.g., software or configuration data) for the modules stored, for example, in the memory component 110.

The imaging system 100 may represent an imaging device, such as a video and/or still camera, to capture and process images and/or videos of the scene 160. In this regard, the image capture component 115 of the imaging system 100 may be configured to capture images (e.g., still and/or video images) of the scene 160 in a particular spectrum or modality. The image capture component 115 includes an image detector circuit 165 (e.g., a thermal infrared detector circuit) and a readout circuit 170 (e.g., a readout integrated circuit (ROIC)). For example, the image capture component 115 may include an IR imaging sensor (e.g., IR imaging sensor array, IR sensor assembly) configured to detect IR radiation in the near, middle, and/or far IR spectrum and provide IR images (e.g., IR image data or signal) representative of the IR radiation from the scene 160. For example, the image detector circuit 165 may capture (e.g., detect, sense) IR radiation with wavelengths in the range from around 700 nm to around 2 mm, or portion thereof. For example, in some aspects, the image detector circuit 165 may be sensitive to (e.g., better detect) short-wave IR (SWIR) radiation, mid-wave IR (MWIR) radiation (e.g., EM radiation with wavelength of 2-5 µm) and/or long-wave IR (LWIR) radiation (e.g., EM radiation with wavelength of 7-14 µm), or any desired IR wavelengths (e.g., generally in the 0.7 to 14 µm range). In other aspects, the image detector circuit 165 may capture radiation from one or more other wavebands of the EM spectrum, such as visible-light, ultraviolet light, and so forth.

The image detector circuit 165 may capture image data associated with the scene 160. To capture the image, the image detector circuit 165 may detect image data of the scene 160 (e.g., in the form of EM radiation) and generate pixel values of the image based on the scene 160. An image may be referred to as a frame or an image frame. In some cases, the image detector circuit 165 may include an array of detectors (e.g., also referred to as an array of pixels) that can detect radiation of a certain waveband, convert the detected radiation into electrical signals (e.g., voltages, currents, etc.), and generate the pixel values based on the electrical signals. Each detector in the array may capture a respective portion of the image data and generate a pixel value based on the respective portion captured by the detector. The pixel value generated by the detector may be referred to as an output of the detector. By way of non-limiting examples, each detector may be a photodetector, such as an avalanche photodiode, an infrared photodetector, a quantum well infrared photodetector, a microbolometer, or other detector capable of converting EM radiation (e.g., of a certain wavelength) to a pixel value. The array of detectors may be arranged in rows and columns.

The image may be, or may be considered, a data structure that includes pixels and is a representation of the image data associated with the scene 160, with each pixel having a pixel value that represents EM radiation emitted or reflected from a portion of the scene and received by a detector that generates the pixel value. Based on context, a pixel may refer to a detector of the image detector circuit 165 that generates an associated pixel value or a pixel (e.g., pixel location, pixel coordinate) of the image formed from the generated pixel values.

In an aspect, the pixel values generated by the image detector circuit 165 may be represented in terms of digital count values generated based on the electrical signals obtained from converting the detected radiation. For example, in a case that the image detector circuit 165 includes or is otherwise coupled to an analog-to-digital converter (ADC) circuit, the ADC circuit may generate digital count values based on the electrical signals. For an ADC circuit that can represent an electrical signal using 14 bits, the digital count value may range from 0 to 16,383. In such cases, the pixel value of the detector may be the digital count value output from the ADC circuit. In other cases (e.g., in cases without an ADC circuit), the pixel value may be analog in nature with a value that is, or is indicative of, the value of the electrical signal. As an example, for infrared imaging, a larger amount of IR radiation being incident on and detected by the image detector circuit 165 (e.g., an IR image detector circuit) is associated with higher digital count values and higher temperatures.

The readout circuit 170 may be utilized as an interface between the image detector circuit 165 that detects the image data and the processing component 105 that processes the detected image data as read out by the readout circuit 170, with communication of data from the readout circuit 170 to the processing component 105 facilitated by the image interface 120. An image capturing frame rate may refer to the rate (e.g., images per second) at which images are detected in a sequence by the image detector circuit 165 and provided to the processing component 105 by the readout circuit 170. The readout circuit 170 may read out the pixel values generated by the image detector circuit 165 in accordance with an integration time (e.g., also referred to as an integration period).

In various embodiments, a combination of the image detector circuit 165 and the readout circuit 170 may be, may include, or may together provide a focal plane array (FPA). In some aspects, the image detector circuit 165 may be a thermal image detector circuit that includes an array of microbolometers, and the combination of the image detector circuit 165 and the readout circuit 170 may be referred to as a microbolometer FPA. In some cases, the array of microbolometers may be arranged in rows and columns. The microbolometers may detect IR radiation and generate pixel values based on the detected IR radiation. For example, in some cases, the microbolometers may be thermal IR detectors that detect IR radiation in the form of heat energy and generate pixel values based on the amount of heat energy detected. The microbolometer FPA may include IR detecting materials such as amorphous silicon (a-Si), vanadium oxide ($VO_x$), a combination thereof, and/or other detecting material(s). In an aspect, for a microbolometer FPA, the integration time may be, or may be indicative of, a time interval during which the microbolometers are biased. In this case, a longer integration time may be associated with higher gain of the IR signal, but not more IR radiation being collected. The IR radiation may be collected in the form of heat energy by the microbolometers.

In some cases, the imaging capture component 115 may include one or more filters adapted to pass radiation of some wavelengths but substantially block radiation of other wavelengths. For example, the imaging capture component 115 may be an IR imaging device that includes one or more filters adapted to pass IR radiation of some wavelengths while substantially blocking IR radiation of other wavelengths (e.g., MWIR filters, thermal IR filters, and narrowband filters). In this example, such filters may be utilized to tailor the imaging capture component 115 for increased sensitivity to a desired band of IR wavelengths. In an aspect, an IR imaging device may be referred to as a thermal imaging device when the IR imaging device is tailored for capturing thermal IR images. Other imaging devices, including IR imaging devices tailored for capturing infrared IR images outside the thermal range, may be referred to as non-thermal imaging devices.

In one specific, not-limiting example, the image capture component 115 may comprise an IR imaging sensor having an FPA of detectors responsive to IR radiation including near infrared (NIR), SWIR, MWIR, LWIR, and/or very-long wave IR (VLWIR) radiation. In some other embodiments, alternatively or in addition, the image capture component 115 may include a complementary metal oxide semiconductor (CMOS) sensor or a charge-coupled device (CCD) sensor that can be found in any consumer camera (e.g., visible light camera).

The images, or the digital image data corresponding to the images, provided by the image capture component 115 may be associated with respective image dimensions (also referred to as pixel dimensions). An image dimension, or pixel dimension, generally refers to the number of pixels in an image, which may be expressed, for example, in width multiplied by height for two-dimensional images or otherwise appropriate for relevant dimension or shape of the image. Thus, images having a native resolution may be resized to a smaller size (e.g., having smaller pixel dimensions) in order to, for example, reduce the cost of processing and analyzing the images. Filters (e.g., a non-uniformity estimate) may be generated based on an analysis of the resized images. The filters may then be resized to the native resolution and dimensions of the images, before being applied to the images.

The image interface 120 may include, in some embodiments, appropriate input ports, connectors, switches, and/or circuitry configured to interface with external devices (e.g., a remote device 150 and/or other devices) to receive images (e.g., digital image data) generated by or otherwise stored at the external devices. The received images or image data may be provided to the processing component 105. In this regard, the received images or image data may be converted into signals or data suitable for processing by the processing component 105. For example, in one embodiment, the image interface 120 may be configured to receive analog video data and convert it into suitable digital data to be provided to the processing component 105.

In some embodiments, the image interface 120 may include various standard video ports, which may be connected to a video player, a video camera, or other devices capable of generating standard video signals, and may convert the received video signals into digital video/image data suitable for processing by the processing component 105. In some embodiments, the image interface 120 may also be configured to interface with and receive images (e.g., image data) from the image capture component 115. In other embodiments, the image capture component 115 may interface directly with the processing component 105.

The control component 125 includes, in one embodiment, a user input and/or an interface device, such as a rotatable knob (e.g., potentiometer), push buttons, slide bar, keyboard, and/or other devices, that is adapted to generate a user input control signal. The processing component 105 may be configured to sense control input signals from a user via the control component 125 and respond to any sensed control input signals received therefrom. The processing component 105 may be configured to interpret such a control input signal as a value, as generally understood by one skilled in the art. In one embodiment, the control component 125 may include a control unit (e.g., a wired or wireless handheld control unit) having push buttons adapted to interface with a user and receive user input control values. In one implementation, the push buttons of the control unit may be used to control various functions of the imaging system 100, such as autofocus, menu enable and selection, field of view, brightness, contrast, noise filtering, image enhancement, and/or various other features of an imaging system or camera.

The display component 130 includes, in one embodiment, an image display device (e.g., a liquid crystal display (LCD)) or various other types of generally known video displays or monitors. The processing component 105 may be configured to display image data and information on the display component 130. The processing component 105 may be configured to retrieve image data and information from the memory component 110 and display any retrieved image data and information on the display component 130. The display component 130 may include display circuitry, which may be utilized by the processing component 105 to display image data and information. The display component 130 may be adapted to receive image data and information directly from the image capture component 115, processing component 105, and/or image interface 120, or the image data and information may be transferred from the memory component 110 via the processing component 105. In an aspect, the display component 130 may provide (e.g., present, direct, project) a user-viewable thermal image into an interior of a wearable apparatus. In some cases, the display component 130 may provide the user-viewable thermal image to an optical relay system inside a wearable apparatus (e.g., behind a shield of the wearable apparatus).

The sensing component 135 includes, in one embodiment, one or more sensors of various types, depending on the application or implementation requirements, as would be understood by one skilled in the art. Sensors of the sensing component 135 provide data and/or information to at least the processing component 105. In one aspect, the processing component 105 may be configured to communicate with the sensing component 135. In various implementations, the sensing component 135 may provide information regarding environmental conditions, such as outside temperature, lighting conditions (e.g., day, night, dusk, and/or dawn), humidity level, specific weather conditions (e.g., sun, rain, and/or snow), distance (e.g., laser rangefinder or time-of-flight camera), and/or whether a tunnel or other type of enclosure has been entered or exited. The sensing component 135 may represent conventional sensors as generally known by one skilled in the art for monitoring various conditions (e.g., environmental conditions) that may have an effect (e.g., on the image appearance) on the image data provided by the image capture component 115.

In some implementations, the sensing component 135 (e.g., one or more sensors) may include devices that relay information to the processing component 105 via wired and/or wireless communication. For example, the sensing component 135 may be adapted to receive information from a satellite, through a local broadcast (e.g., radio frequency (RF)) transmission, through a mobile or cellular network and/or through information beacons in an infrastructure (e.g., a transportation or highway information beacon infrastructure), or various other wired and/or wireless techniques. In some embodiments, the processing component 105 can use the information (e.g., sensing data) retrieved from the sensing component 135 to modify a configuration of the image capture component 115 (e.g., adjusting a light sensitivity level, adjusting a direction or angle of the image capture component 115, adjusting an aperture, etc.).

In some embodiments, various components of the imaging system 100 may be distributed and in communication with one another over a network 155. In this regard, the imaging system 100 may include a network interface 140 configured to facilitate wired and/or wireless communication among various components of the imaging system 100 over the network 155. In some cases, the various components of the imaging system 100 may be provided in separate housings (e.g., as separate modules) attached to a wearable apparatus, with communication within each module and between modules being facilitated using wired and/or wireless communication. A communication component may be configured to handle internal communication between various components of the imaging system 100. For example, components such as the imaging capture component 115, the display component 130, and/or other components may transmit and receive data to and from the processing component 105 through the communication module, which may manage wired and/or wireless connections (e.g., through proprietary RF links and/or through standard wireless communication protocols such as IEEE 802.11 WiFi standards and Bluetooth™) between the various components.

Components may also be replicated if desired for particular applications of the imaging system 100. That is, components configured for same or similar operations may be distributed over a network. Further, all or part of any one of the various components may be implemented using appropriate components of the remote device 150 (e.g., a conventional digital video recorder (DVR), a computer configured for image processing, and/or other device) in communication with various components of the imaging system 100 via the network interface 140 over the network 155, if desired. Thus, for example, all or part of the processing component 105, all or part of the memory component 110, and/or all of part of the display component 130 may be implemented or replicated at the remote device 150. In some embodiments, the imaging system 100 does not include imaging sensors (e.g., image capture component 115), but instead receive images or image data from imaging sensors located separately and remotely from the processing component 105 and/or other components of the imaging system 100. It will be appreciated that many other combinations of distributed implementations of the imaging system 100 are possible, without departing from the scope and spirit of the disclosure.

Furthermore, in various embodiments, various components of the imaging system 100 may be combined and/or implemented or not, as desired or depending on the application or requirements. In one example, the processing component 105 may be combined with the memory component 110, image capture component 115, image interface 120, display component 130, sensing component 135, and/or network interface 140. In another example, the processing component 105 may be combined with the image capture component 115, such that certain functions of the processing component 105 are performed by circuitry (e.g., a processor, a microprocessor, a logic device, a microcontroller, etc.) within the image capture component 115.

Figure 2:
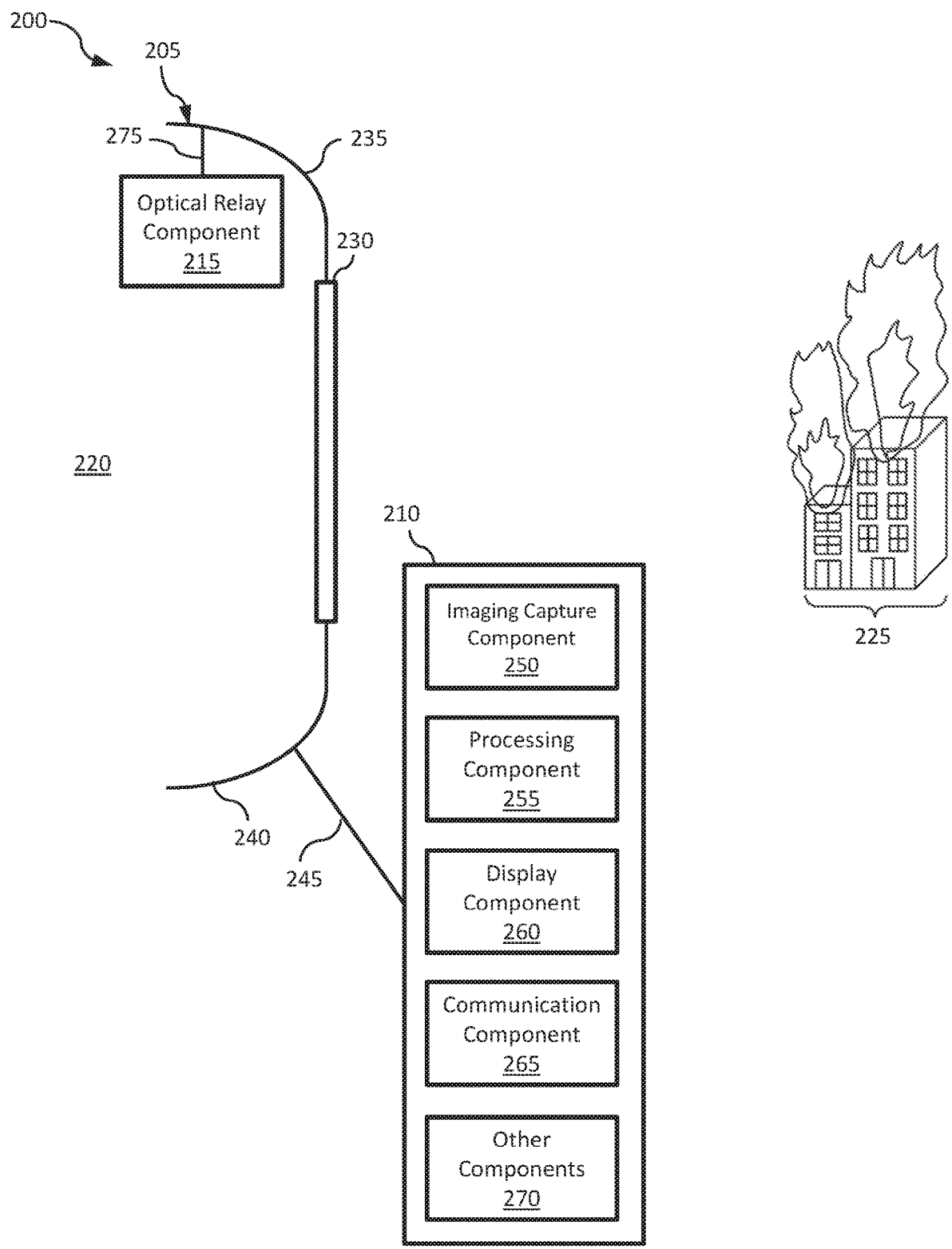
FIG. 2 illustrates a block diagram of an example system having a wearable apparatus, an attachment, and an optical relay component in accordance with one or more embodiments of the present disclosure.

FIG. 2 illustrates a block diagram of an example system 200 in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

The system 200 includes a wearable apparatus 205, an attachment 210 releasably coupled to an exterior of (e.g., also referred to as outside of) the wearable apparatus 205, and an optical relay component 215 coupled to an interior of (e.g., also referred to as inside of) the wearable apparatus 205. The wearable apparatus 205 protects at least a portion of a user 220 from an external environment 225 (e.g., a scene) when the wearable apparatus 205 is worn by the user 220. The wearable apparatus 205 includes a shield 230 and structural members 235 and 240. The shield 230 may protect at least a portion of a face of the user 220 from the external environment 225 when the wearable apparatus 205 is worn by the user 220. By way of non-limiting examples, the shield 230 may be made of polymers (e.g., polycarbonate), metal, or any other appropriate materials durable enough to provide a protective barrier against heat, intensive light rays, debris, and/or other harmful elements from the external environment 225. In some cases, the shield 230 may include or may be coated with one or more appropriate protective layers to enhance or provide protection against such harmful elements.

The structural members 235 and 240 may partially or completely enclose a face, head, or any desired portion of the user 220 (e.g., including the entirety of the user 220 if desired based on application). The shield 230 and the structural members 235 and 240 collectively provide protection to at least a portion of the user 220 as appropriate for a given application (e.g., firefighting application, welding application, underwater application, etc.). Although the shield 230 and the structural members 235 and 240 are illustrated in FIG. 2 as having a certain shape (e.g., curvature) and size, the shield 230 and the structural members 235 and 240 may be implemented with any desired shape and size to provide appropriate protection and functionality to the user 220 for a desired application(s). The wearable apparatus 205 may include other hardware, such as a mask frame, a hood, straps, fasteners, harnesses, connectors, hoses, and other various hardware and protective equipment and clothing as may be desired for certain applications of the wearable apparatus 205. It is noted that the wearable apparatus 205 may be implemented as any type of wearable device, equipment, gear, mask, helmet, garment, and/or clothing that includes the shield 230 to protect at least a portion of a face of the user 220 from the external environment 225.

In some embodiments, at least a portion of the shield 230 may allow images provided by (e.g., displayed on, projected by) the display component 260 to be relayed (e.g., projected, directed, passed) through the shield 230 and to the optical relay component 215, and the optical relay component 215 in turn may relay (e.g., direct) the images to the user 220. One end of the optical relay component 215 may be positioned in proximity (e.g., with regard to user preference) to the user 220 to allow the user 220 when wearing the wearable apparatus 205 to readily view the images provided by the display component 260. In this regard, the display component 260 and the optical relay component 215 may be considered portions of an eyepiece (e.g., a display, a screen), separated by the shield 230, for providing images for viewing by the user 220.

In one embodiment, the shield 230 may pass at least some visible light so that the user 220 can view the external environment 225 through the shield 230, while still being protected against harmful radiation (e.g., appropriate types of infrared radiation, ultraviolet radiation, and/or others), debris, and/or other elements. For example, in this case, the user 220 may be able to view the external environment 225 through the shield 230 as well as view the external environment 225 as represented in an image that is relayed to the user 220 via the optical relay component 215. In another embodiment, a portion, a majority, or an entirety of the shield 230 may be opaque or non-transparent (e.g., when the shield 230 is made of metal).

The attachment 210 is releasably coupled to an exterior of the wearable apparatus 205 using one or more engagement elements 245. In an aspect, the attachment 210 is releasably coupled to an exterior surface (e.g., surface that faces away from the user 220) of the structural members 235 and/or 240 of the wearable apparatus 205. In some cases, a position at which the attachment 210 is coupled to the wearable apparatus 205 may be selected by the user 220. In some cases, such as those cases where the user 220 can see through the shield 230, the attachment 210 may be fixedly positioned or adjustably positioned (e.g., by the user 220) such that obscuring of a line of sight of the user 220 through the shield 230 by the optical relay component 215 is minimized or eliminated.

The engagement element(s) 245 may include metal, magnets, adhesives (e.g., glue, tape), screws, bolts, pop rivets, bumps and ridges, suction cups, and/or generally any fasteners and/or fastening structure that can securely and releasably couple the attachment 210 to the wearable apparatus 205. The engagement element(s) 245 may be provided as part of the attachment 210, the wearable apparatus 205, and/or a separate component(s) to facilitate such physical coupling of the attachment 210 to the wearable apparatus 205. As an example, the engagement element(s) 245 may include a magnet provided on the attachment 210 and a magnet provided on the wearable apparatus 205 such that these two magnets can magnetically couple the attachment 210 to the wearable apparatus 205. As another example, the engagement element(s) 245 may include a magnet provided on the attachment 210 that can be coupled to metal material of the wearable apparatus 205. As another example, the engagement element(s) 245 may include a slot of the attachment 210 that can receive a ridge of the wearable apparatus 205.

The attachment 210 includes an imaging capture component 250, a processor component 255, a display component 260, a communication component 265, and other components 270. In an embodiment, the attachment 210 may be, may include, may be a part or, or may include components similar to those of the imaging system 100 of FIG. 1. In this regard, components of the attachment 210 may be implemented in the same or similar manner as various corresponding components of the imaging system 100.

The imaging capture component 250 captures images of a scene, such as the external environment 225, and provide the images to the processing component 255. In some cases, the imaging capture component 250 may process the captured images and provide the processed images to the processor component 255 (e.g., for further processing). For explanatory purposes, the imaging capture component 250 is utilized to capture thermal images of a scene, although in other embodiments the imaging capture component 250 may be utilized to capturing data of the external environment 225 associated with other wavebands. In an aspect, the imaging capture component 250 may include one or more IR image sensors for capturing infrared images (e.g., thermal infrared images). The IR imaging sensor(s) may include an FPA implemented, for example, in accordance with various embodiments disclosed herein or others where appropriate. The IR imaging sensors may be small form factor infrared imaging devices. The IR imaging sensor(s) may be capable of detecting and capturing SWIR radiation, LWIR radiation, MWIR radiation, and/or other radiation in infrared bands (e.g., such as thermal bands) as may be desired. In one case, the IR imaging sensor(s) may capture thermal images of the external environment 225 even in complete darkness. For example, thermal images provided by the IR imaging sensor(s) may reveal invisible hazards, such as gas leaks, thermal hot spots, or others. Such thermal images may include an accurate temperature reading of each pixel in the images. In an aspect, an example of an imaging sensor is described with respect to FIG. 8.

In one embodiment, the imaging capture component 250 may include multiple imaging sensors (e.g., multiple IR imaging sensors) such that the imaging sensors may be utilized to capture stereoscopic thermal images and/or panoramic thermal images of the external environment 225. Alternatively or in addition, one or more of the IR imaging sensors may provide fault tolerance by serving as backups to each other (e.g., if one of the IR imaging sensors requires fixing or replacement).

The processing component 255 processes and/or otherwise manages images captured by the imaging capture component 250. The processing component 255 may be implemented as any appropriate processing device as described with regard to the processing component 105 of FIG. 1. In one embodiment, the processing component 255 may receive thermal images captured by the imaging capture component 250 and process the thermal images to generate user-viewable thermal images (e.g., thermograms) of the external environment 225. The user-viewable thermal images may be visible-light representations of the captured thermal images. The user-viewable thermal images may be provided by the processing component 255 to the display component 260 to facilitate viewing of the user-viewable thermal images by the user 220. In an aspect, the processing component 255 may generate and overlay information and/or alarms (e.g., a temperature reading, a gas detection alarm, a mask pressure reading and alarm, an oxygen tank reading and alarm, and/or others) onto the user-viewable thermal images. In some cases, the processing component 255 may receive thermal images from two or more IR imaging sensors of the imaging capture component 250 and combine the thermal images to generate stereoscopic user-viewable images (e.g., three dimensional thermograms) of the external environment 225 therefrom.

In some aspects, processing of captured images may be distributed between the imaging capture component 250, the processor component 255, the display component 260, and/or the other components 270. For example, in some cases, the processor component 255 and/or the imaging capture component 250 may perform automatic exposure control (e.g., by controlling signal gain, camera aperture, and/or shutter speed) on the imaging capture component 250 to adjust to changes in the infrared intensity and temperature level of the external environment 225.

The display component 260 receives user-viewable images from the processing component 255 and facilitates viewing of user-viewable images by the user 220. The processing component 255 may transmit the user-viewable images to the display component 260 via wired and/or wireless communication. The display component 260 may include one or more optical elements (e.g., lenses, prisms, mirrors, light tube, fiber optic, waveguide) appropriately arranged to provide (e.g., direct, project) a user-viewable image through the shield 230 and into the optical relay component 215 positioned in an interior of the wearable apparatus 205. The optical relay component 215 in turn may provide (e.g., relay, direct, project) the user-viewable thermal image to the user 220 (e.g., to the eyes of the user 220). In some cases, an end of the optical relay component 215 may be positioned in proximity to the user 220 to allow the user 220 to readily view the user-viewable thermal image when desired. Providing of the user-viewable image from the display component 260 into the wearable apparatus 205 may be referred to as mirroring (e.g., telescopically mirroring) or coupling the user-viewable image from the display component 260 into the wearable apparatus 205.

In some aspects, a position of the display component 260 and/or the optical relay component 215 is adjustable. The adjustable positioning may be based on application and/or user preference. For instance, the display component 260 and the optical relay component 215 may be appropriately positioned in relation to each other such that the head of the user 220 is at a desired position relative to the optical relay component 215 and/or other components inside the wearable apparatus 205. Such positioning may also reduce a bulkiness and/or size associated with the system 200 as a whole (e.g., as perceived by the user 220 and/or physical volume of the system 200).

The display component 260 may be positioned so as to selectively provide the user-viewable thermal image through the shield 230 and into the optical relay component 215. For example, the display component 260 can be turned on to provide the user-viewable thermal image through a portion of the shield 230 that is within a line of sight of the user 220 and/or the optical relay component 215 while the wearable apparatus 205 is worn by the user 220, and can be turned off when the user 220 desires a clear view through the shield 230. In some cases, a direction at which the display component 260 provides the user-viewable image may be adjustable to allow telescopic mirroring of the user-viewable image to a desired position. The desired position may be one that is preferred by the user 220, such as in terms of comfort of the user 220 (e.g., due to positioning of the user 220 relative to the optical relay component 215 and/or other components) and/or location of the eyes of the user 220 relative to the mirrored user-viewable thermal image. For instance, the direction may be selected to allow the user-viewable thermal image to be provided through an area of the shield 230 that facilitates viewing by the user 220. As an example, the direction may be selected to allow the user 220 to view both the external environment 225 through the shield 230 and the user-viewable thermal images provided to the user 220 via the optical relay component 215.

In various embodiments, the display component 260 and/or the processing component 255 may perform distortion correction of user-viewable images. The display component 260 may optically correct distortion using optical elements such as lenses, prisms, and mirrors. In some cases, the display component 260 may provide two or more beams to present stereoscopic user-viewable images of the external environment 225 to the user 220. In some aspects, the display component 260 may be implemented with a projector, such as any appropriate small form factor projector. In various embodiments, the projector may be implemented in accordance with various technologies such as digital light processing (DLP), liquid crystal on silicon (LCoS), laser beam steering (LBS), holographic laser projection (HLP), and/or others as appropriate. In one example, the display component 260 may project three-dimensional user-viewable images using HLP technology. In embodiments in which the projector is implemented with HLP technology, distortion may be corrected through appropriate operations performed by the projector and/or the processing component 255. In this regard, such HLP technology may implement holographic processes to generate interference or diffraction patterns of an image instead of the image itself, and focused laser beams may be projected through such interference patterns to direct light as desired without relying on optical elements.

The communication component 265 may handle communication between various components of the attachment 210. For example, components such as the imaging capture component 250, the processing component 255, and the display component 260 may transmit data to and receive data from each other via the communication component 265. The communication component 265 may facilitate wired and/or wireless connections. By way of non-limiting examples, such connections may be provided using inter-chip connections, intra-chip connections, proprietary RF links, and/or standard wireless communication protocols (e.g., IEEE 802.11 WiFi standards, and Bluetooth™) between the various components.

In some aspects, the communication component 265 may also handle communication with devices external to the attachment 210. For example, the communication component 265 may transmit and receive user-viewable images to and from other wearable apparatuses, a monitoring station so that user-viewable images can be shared with other users, and/or other devices. In another example, the communication component 265 may allow a radio communication between users of different wearable apparatuses.

The other components 270 of the attachment 210 may be used to implement any features of the system 200 as may be desired for various applications. By way of non-limiting examples, the other components 265 may include a memory, various sensors (e.g., motion sensor), a microphone and speaker for voice communication, timers, a flashlight, and a visible light camera, and/or others.

The optical relay component 215 is coupled (e.g., releasably or permanently coupled) to an interior of the wearable apparatus 205 using one or more engagement elements 275. In an aspect, the optical relay component 215 is coupled to an interior surface (e.g., surface that faces the user 220) of the structural members 235 and/or 240 of the wearable apparatus 205. In some cases, a position at which the optical relay component 215 is coupled to the wearable apparatus 205 may be selected by the user 220. In some cases, such as those cases where the user 220 can see through the shield 230, the optical relay component 215 may be fixedly or adjustably positioned such that obscuring, by the optical relay component 215, of a line of sight of the user 220 through the shield 230 is minimized or eliminated. The engagement element(s) 275 may include metal, magnets, adhesives (e.g., glue, tape), screws, bolts, pop rivets, bumps and ridges, suction cups, and/or generally any fasteners and/or fastening structure that can securely (and in some cases releasably) couple the optical relay component 215 to the wearable apparatus 205. The engagement element(s) 275 may be provided as part of the optical relay component 215, the wearable apparatus 205, and/or a separate component(s) to facilitate such physical coupling of the optical relay component 215 to the wearable apparatus 205. As examples, the engagement element(s) 275 may include a magnet provided on the optical relay component 215 and a magnet provided on the wearable apparatus 205, or a magnet provided on the optical relay component 215 that can be coupled to metal material of the wearable apparatus 205. As another example, the engagement element(s) 275 may include a slot of the optical relay component 215 that can receive a ridge of the wearable apparatus 205.

The optical relay component 215 receives the user-viewable image (e.g., a projection of the user-viewable image) from the display component 260 and relays (e.g., directs) the user-viewable image to the user 220 (e.g., the eyes of the user 220). The optical relay component 215 is a non-electronic component. The optical relay component 215 may include one or more optical elements (e.g., lenses, prisms, mirrors, light tube, fiber optic, waveguide) appropriately arranged to receive the user-viewable image from the display component 260 and relay the user-viewable image to the user 220. The optical relay component 215 may include one or more housings to at least partially enclose the optical element(s). In an aspect, the optical relay component 215 provides an eyepiece positioned in proximity to the user 220 to allow the user 220 to readily view user-viewable image when desired by the user 220. For example, one end of the eyepiece has an eyepiece optic (e.g., a lens, mirror, or other optical element) appropriate to direct the user-viewable image to the user 220 (e.g., to the eyes of the user 220).

In an embodiment, the optical relay component 215 and the display component 260 may include respective arrangements of optical elements appropriate to direct the user-viewable image (e.g., user-viewable thermal image) to the user 220 (e.g., the eyes of the user 220). As such, the optical relay component 215 and the display component 260 may each be considered as providing a portion of an eyepiece for providing the user-viewable image to the user 220. In this regard, the optical relay component 215 and the display component 260 may be referred to as providing a divided eyepiece system, in which a portion of the eyepiece is provided external to the wearable apparatus 205 by the display component 260 and a remaining portion of the eyepiece is provided internal to the wearable apparatus 205 by the optical relay component 215. Dividing of the eyepiece may allow less space inside the wearable apparatus 205 to be needed to accommodate the eyepiece (e.g., relative to a case in which an entirety of the eyepiece is inside the wearable apparatus 205), and accordingly allow more flexibility in positioning the display component 260 and/or the optical relay component 215 to facilitate viewing of an image and/or directly viewing the external environment 225 by the user 220.

Although in the foregoing embodiments the display component 260 provides the user-viewable images to the optical relay component 215 and the optical relay component 215 in turn relays and provides the user-viewable images to the user 220 (e.g., to the eyes of the user 220), in some embodiments the display component 260 may present the user-viewable image to the user 220 directly (e.g., without utilizing the optical relay component 215). In such embodiments, the user 220 may look through the shield 230 and/or other portion of the wearable apparatus 205 to see the user-viewable thermal image displayed on the display component 260, and/or the display component 260 may direct the user-viewable images (e.g., using an arrangement of optical elements) directly to the user 220. As one example, the display component 260 may project the user-viewable images onto an external surface of the wearable apparatus 205 and/or an internal surface of the wearable apparatus 205 for viewing by the user 220.

Figure 3:
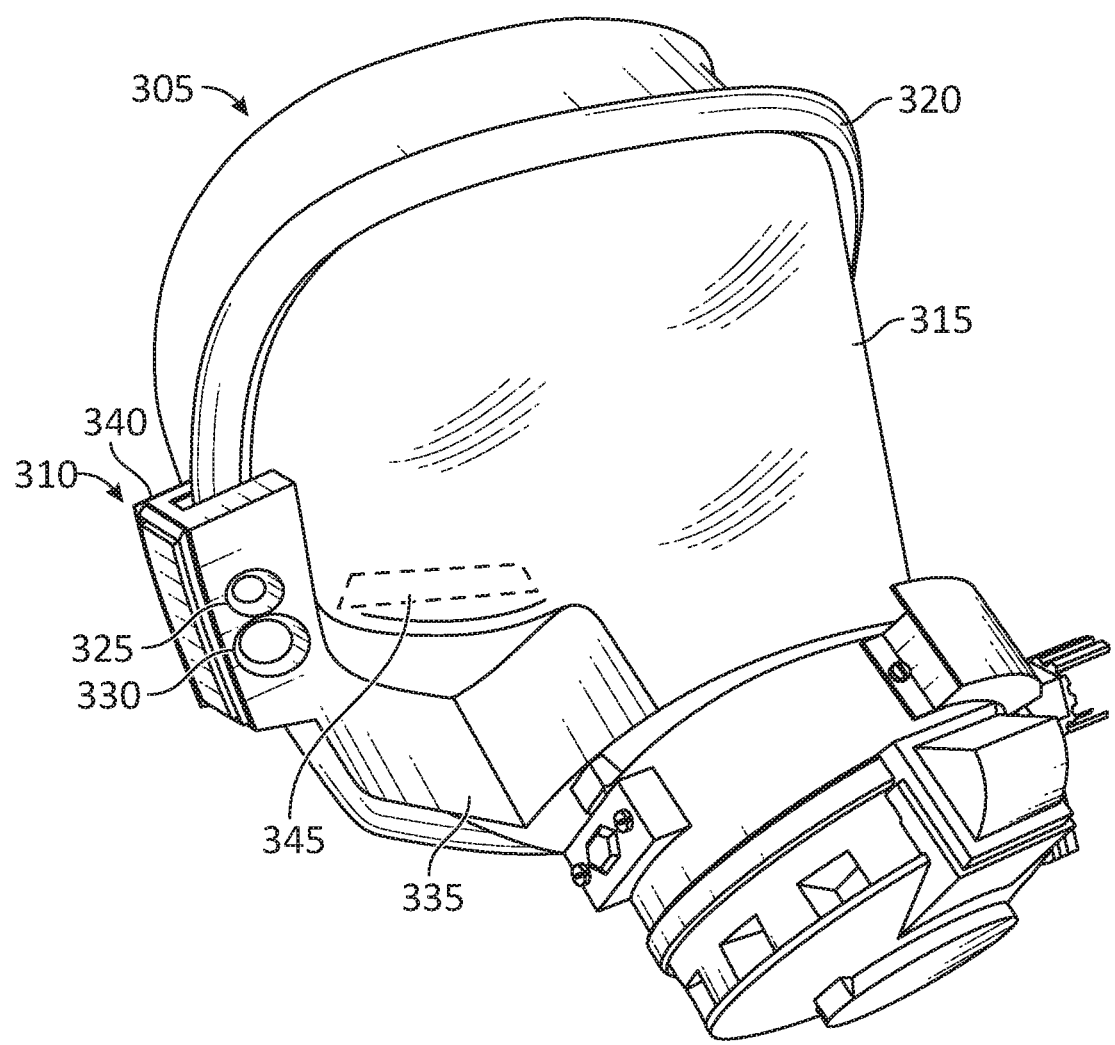
FIG. 3 illustrates a perspective view of a wearable apparatus and an attachment coupled thereto in accordance with one or more embodiments of the present disclosure.

FIG. 3 illustrates a perspective view of a wearable apparatus 305 and an attachment 310 coupled thereto in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. In an embodiment, the wearable apparatus 305 may be one implementation of the wearable apparatus 205 of FIG. 2, and/or the attachment 310 may be, may include, or may be a part of the attachment 210 of FIG. 2. An optical relay component 345 is provided in an interior of the wearable apparatus 305. In an embodiment, the wearable apparatus 305 may be, may include, or may be a part of an SCBA.

In one embodiment, the wearable apparatus 305 may be implemented as a face mask for use by firefighters and/or other emergency personnel working in hazardous environments. In this regard, the wearable apparatus 305 may be implemented to attach to a portable air supply (e.g., one or more high-pressure air tanks) and may further include an inhalation connection (e.g., a mouthpiece or an orinasal cover and a hose connector) to the air supply while protecting a wearer's face from hazardous environments. In another embodiment, the wearable apparatus 305 may be configured for underwater use as a self-contained underwater breathing apparatus (SCUBA).

The wearable apparatus 305 includes a shield 315 (e.g., a mask glass) and a mask frame 320 onto which the shield 315 is sealingly fit. The shield 315 may be made of a clear polymer (e.g., polycarbonate) or other similar suitable materials that allow the user to see through while providing a protective barrier against heat, flames, intense infrared and ultraviolet rays, debris, and/or other harmful elements from an external environment. The shield 315 may include multiple layers of protective shields and/or surface coatings to enhance protection. In an aspect, the mask frame 320 may correspond to the structural members 235 and 240 of FIG. 2. In one example, the mask frame 320 may include an edge that engages the contours of the user's face, so that the user's face and the wearable apparatus 305 form an interior space that is substantially sealed from an external environment. In some cases, the interior space of wearable apparatus 305 may maintain a positive pressure (i.e., higher pressure inside the wearable apparatus 305 than outside) so as to prevent inward leaking.

The attachment 310 includes imaging sensors 325 and 330, a display component 335, and an engagement element 340. In one example, at least one of the imaging sensors 325 or 330 is an IR imaging sensor (e.g., a thermal IR imaging sensor). For instance, the imaging sensor 325 may be an IR imaging sensor and the imaging sensor 330 may be a visible-light imaging sensor, or vice versa. The attachment 310 may also include a processing component, a communication component, memory, and/or other components. Components of the attachment 310 may be included partially within and/or partially external to a housing of the attachment 310. In some cases, rather than a single housing, the attachment 310 may include multiple, separate housings external to the wearable apparatus 305. Each of these housings may include one or more respective engagement elements to attach the housing to the wearable apparatus 305 and/or another housing. In an aspect, one or more of the components of the attachment 310 may be implemented in the same or similar manner as various corresponding components of the attachment 210 described above with regard to FIG. 2.

In FIG. 3, the engagement element 340 releasably couples the attachment 310 to the mask frame 320 of the wearable apparatus 305. The engagement element 340 may be a clamp. Although in FIG. 3 the attachment 310 is attached to a lower left side of the wearable apparatus 305, in other embodiments the attachment 310 may be attached to other locations of the wearable apparatus 305. For example, the attachment 310 may be attached to an upper middle part of the wearable apparatus 305, upper right part of the wearable apparatus 305, or other locations. A location at which the attachment is attached may be based on application, structural features of the wearable apparatus 305 and/or the attachment 310, and/or user preference. In some cases, the attachment 310 may be moveable about the mask frame 320 or other portion of the wearable apparatus 305. In some cases, a corresponding movement of the optical relay component 345 positioned in an interior of the wearable apparatus 305 (e.g., positioned behind the shield 315) may need to be effectuated to allow mirroring of a user-viewable thermal image generated by the attachment 310 to the optical relay component 345.

One or more of the imaging sensors 325 and 330 may be utilized to capture thermal images of a scene (e.g., an external environment). A processing component of the attachment 310 may process the thermal images to generate user-viewable thermal images. The user-viewable thermal images may be provided to the display component 335 and then mirrored by the display component 335 to the interior of the wearable apparatus 305. The user-viewable thermal images may be provided by the display component 335 to the optical relay component 345 positioned in the interior of the wearable apparatus 305. The optical relay component 345 may be positioned close to the eyes of the user. As discussed above in connection with the display component 260 of FIG. 2, the display component 335 may allow the user to selectively turn on/off and adjust the position at which to mirror a user-viewable thermal image. In some cases, the mirrored user-viewable thermal image can be positioned such that the user can simultaneously view the external environment through the shield 315 and the mirrored user-viewable thermal image. In some cases, distortion correction may be performed by the display component 335 and/or the processing component on the user-viewable thermal image and the corrected user-viewable thermal image provided to the user. In one aspect, the display component 335 may project a user-viewable thermal image on an outer surface of the shield 315 and the user may view the user-viewable thermal image by viewing the outer surface of the shield 315.

Thus, the wearable apparatus 305 advantageously allows the user (e.g., firefighters, emergency personnel, divers, or anyone wearing the wearable apparatus 305 for protection from an external environment) to comfortably view a user-viewable thermal image that helps the user recognize much more about an external environment (e.g., see through smoke, water or in darkness, discern victims or other objects, detect the base of fire, detect the temperature of objects, detect invisible gas leaks, or other phenomena) than what can be seen through the naked eye or through CCD-based or CMOS-based sensors.

In some embodiments, a wearable apparatus (e.g., 205, 305) may be a welding mask. The welding masks may be worn by a user and may include a shield, one or more imaging sensors (e.g., IR imaging sensors), a processing component, a display component, and/or other components, each of which may be implemented in the same or similar manner as various corresponding components of the wearable apparatus 205 and/or the wearable apparatus 305 described above. The shield may be made of one or more layers of durable material that is opaque or substantially non-transparent, so as to protect a user's face from intense light (e.g., including infrared and ultraviolet light) as well as from heat, sparks, and other debris that may be generated during welding. A viewing window of the welding mask may be tinted (e.g., using tinted sheets of glass, polarized lenses, automatic LCD shutter, or other appropriately tinted materials) to attenuate the intensity of light that may reach the user's eyes while still allowing the user to see through. In one example, one or more imaging modules may be mounted externally on an external surface of the shield.

The display component may provide a user-viewable thermal image of a welding environment to the user, either directly (e.g., direct projection) or via an optical relay component inside the welding mask. User-viewable thermal images may help the user better discern a welding scene, since the user-viewable thermal images may be substantially clear of blindingly intense visible light radiation that are generated when welding. As provided above, the imaging sensor(s) and/or the processing component may provide automatic exposure control, so as to generate user-viewable thermal images that are desirably adjusted to the infrared intensity and temperature level in the welding scene. Exposure-adjusted user-viewable thermal images may provide a clear view of the welding scene even when the infrared intensity and temperature level change (e.g., when the user turns off a welding arc to adjust a welding tip of appropriate welding equipment), so that the user can view the welding scene without having to lift, remove, and/or otherwise adjust the welding mask for a better view. In some cases, the processing component may overlay temperature readings and/or temperature scales onto a user-viewable thermal image to be provided to the user. Such temperature readings and/or temperature scales may help a user to determine whether the temperature of a welding arc and/or welding pool is proper for a welding task.

As such, the welding mask may be utilized to protect a welder's face from harsh elements of a welding environment, while also presenting a user-viewable thermal image to a welder that provides a clearer view of a welding environment and, if desired, useful information such as temperature readings of weld materials and a view of otherwise invisible objects (e.g., gas leaks).

Figure 4:
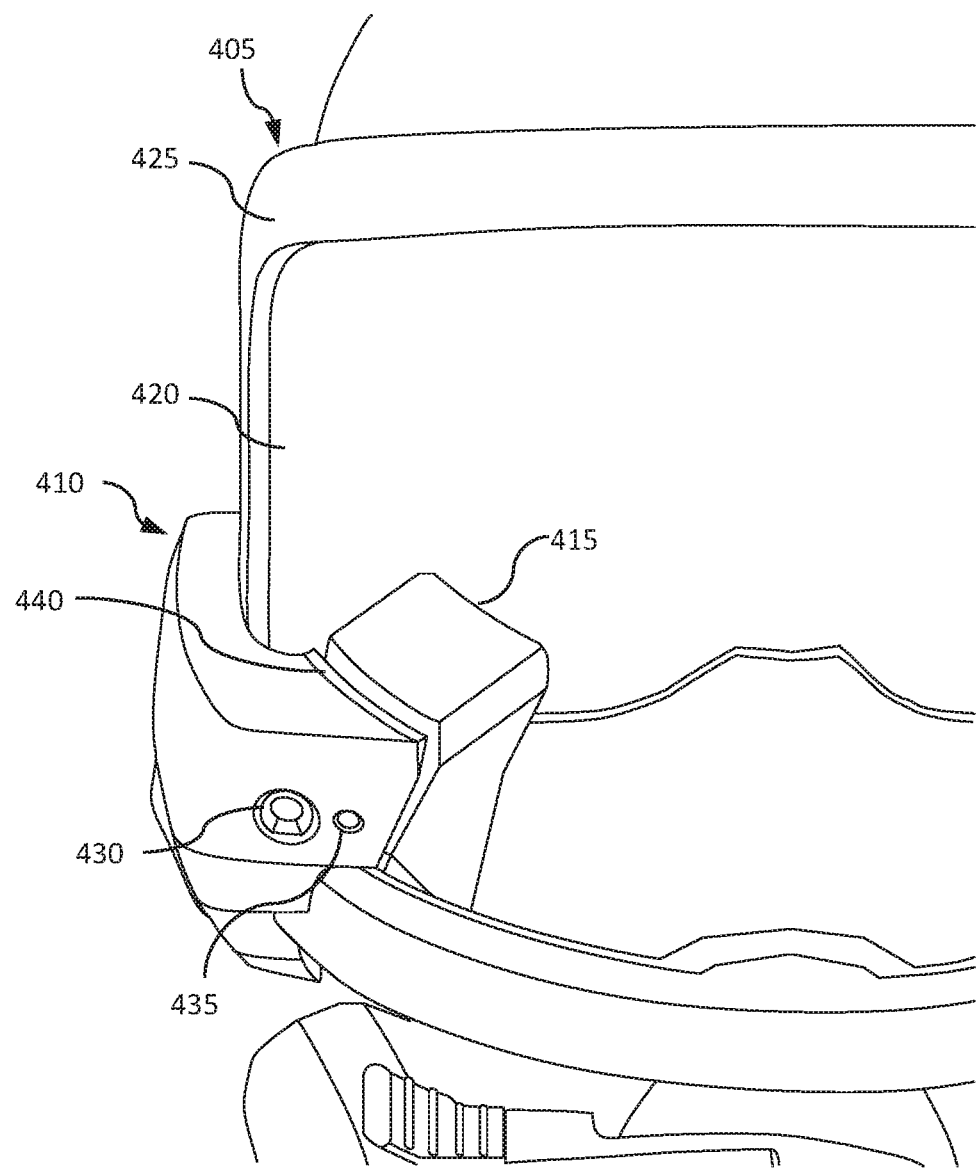
FIG. 4 illustrates a partial view of a wearable apparatus, an attachment, and an optical relay component in accordance with one or more embodiments of the present disclosure.
Figure 5:
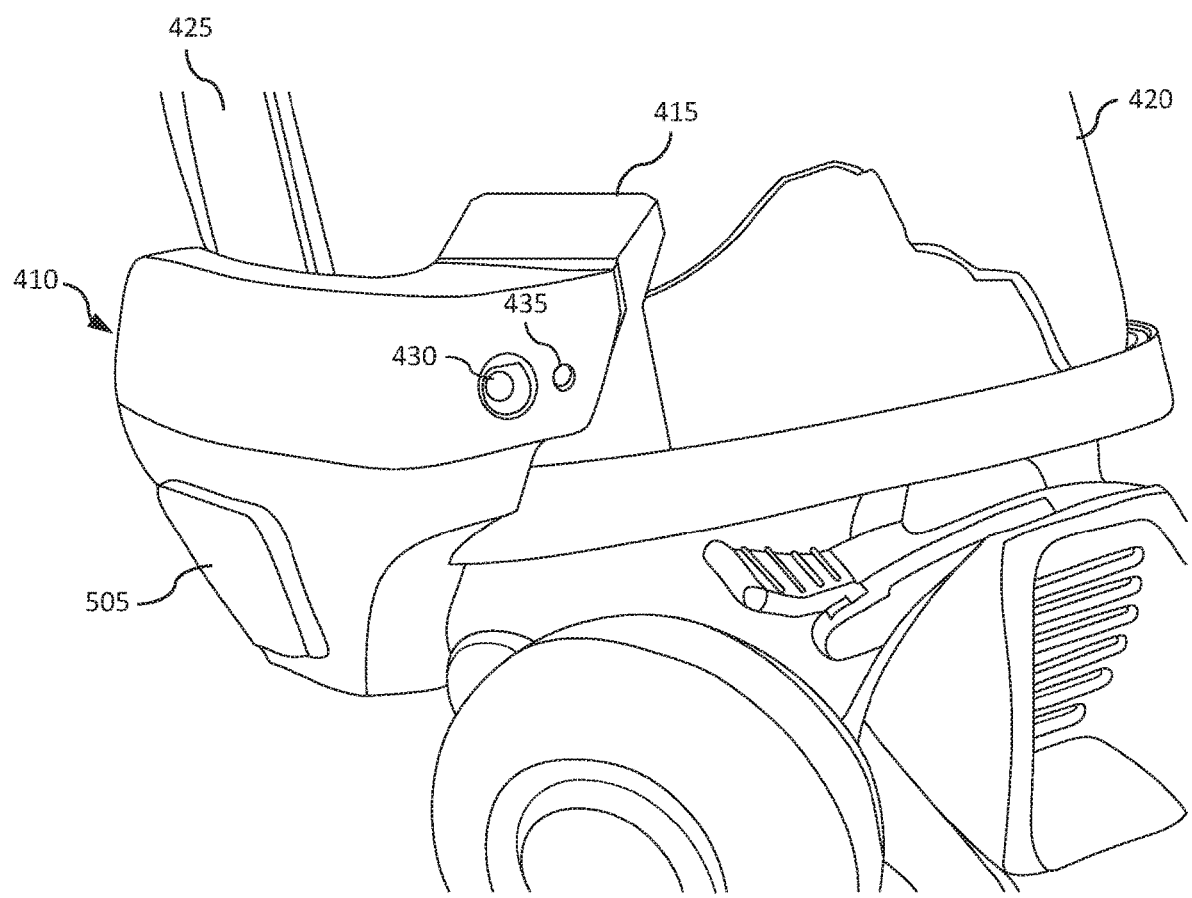
FIG. 5 illustrates a zoomed-in view of a wearable apparatus, an attachment, and an optical relay component in accordance with one or more embodiments of the present disclosure.

FIG. 4 illustrates a partial view of a wearable apparatus 405, an attachment 410, and an optical relay component 415 in accordance with one or more embodiments of the present disclosure. FIG. 5 illustrates a zoomed-in view of the wearable apparatus 405, the attachment 410, and the optical relay component 415 in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. In an embodiment, one or more of the components of the wearable apparatus 405, the attachment 410, and the optical relay component 415 may be implemented in the same or similar manner as various corresponding components of the wearable apparatus (e.g., 205, 305), the attachment (e.g., 210, 310), and the optical relay component (e.g., 215, 345) described above with regard to FIGS. 2 and/or 3.

The wearable apparatus 405 includes a shield 420 and a mask frame 425 onto which the shield 420 is sealingly fit. The shield 420 may be made of a clear polymer (e.g., polycarbonate) or other similar suitable materials that allow the user to see through while providing a protective barrier. The shield 420 may include multiple layers of protective shields and/or surface coatings to enhance protection. In an aspect, the mask frame 425 may correspond to the structural members 235 and 240 of FIG. 2.

The attachment 410 includes imaging sensors 430 and 435 and a display component 440. The attachment 410 may also include a processing component, a communication component, memory, and/or other components. The imaging sensor 430 may be an IR imaging sensor (e.g., a thermal IR imaging sensor) and the imaging sensor 435 may be a visible-light imaging sensor. Components of the attachment 410 may be included partially within and/or partially external to a housing of the attachment 410. In some cases, rather than a single housing, the attachment 410 may include multiple, separate housings external to the wearable apparatus 405. Each of these housings may include one or more respective engagement elements to attach the housing to the wearable apparatus 405 and/or another housing.

The imaging sensor 430 may capture thermal images. The processing component of the attachment 410 may process the thermal images to generate user-viewable thermal images. The user-viewable thermal images may be provided to the display component 440 and then mirrored by the display component 440 to the interior of the wearable apparatus 405. In this regard, the user-viewable thermal images may be provided by the display component 440 to the optical relay component 415 positioned in the interior of the wearable apparatus 405. The optical relay component 415 is appropriate positioned to receive the user-viewable thermal images (or other image data) from the display component 440. A button 505 provided on the attachment 410 to turn on or off the attachment 410 (or portion thereof).

The attachment 410 may be releasably coupled to an exterior of the wearable apparatus 405 using one or more engagement elements. In one non-limiting example, the attachment 410 may include various shapes and contours and/or adhesives applied thereto to couple the attachment 410 to the shield 420 and/or the mask frame 425 of the wearable apparatus 405. The optical relay component 415 may be coupled to an interior of the wearable apparatus 405 using one or more engagement elements. In one aspect, the display component 440 and the optical relay component 415 may abut surfaces of the shield 420. A gasket or other structure may be provided to seal to prevent smoke, debris, and/or other elements from coming between the display component 440 and the optical relay component 415. In one non-limiting example, suction cups and/or adhesives may be provided to couple the optical relay component 415 to the shield 420 and/or the mask frame 425 of the wearable apparatus 405. In another non-limiting example, a first magnet may be utilized to couple the attachment 410 to the exterior of the wearable apparatus 405, and a second magnet may be utilized to couple the optical relay component 415 to the interior of the wearable apparatus 405. In some cases of this example, the first magnet and the second magnet may be appropriately positioned such that the first and second magnets attract each other, in which such magnetic attraction may facilitate alignment between the display component 440 and the optical relay component 415. As shown in FIG. 4, the display component 440 is adjacent to and faces the optical relay component 415, with the shield 420 dividing (e.g., positioned between) the display component 440 and the optical relay component 415. In this regard, the display component 440 and the optical relay component 415 are on opposite surfaces of the shield 420.

Figure 6:
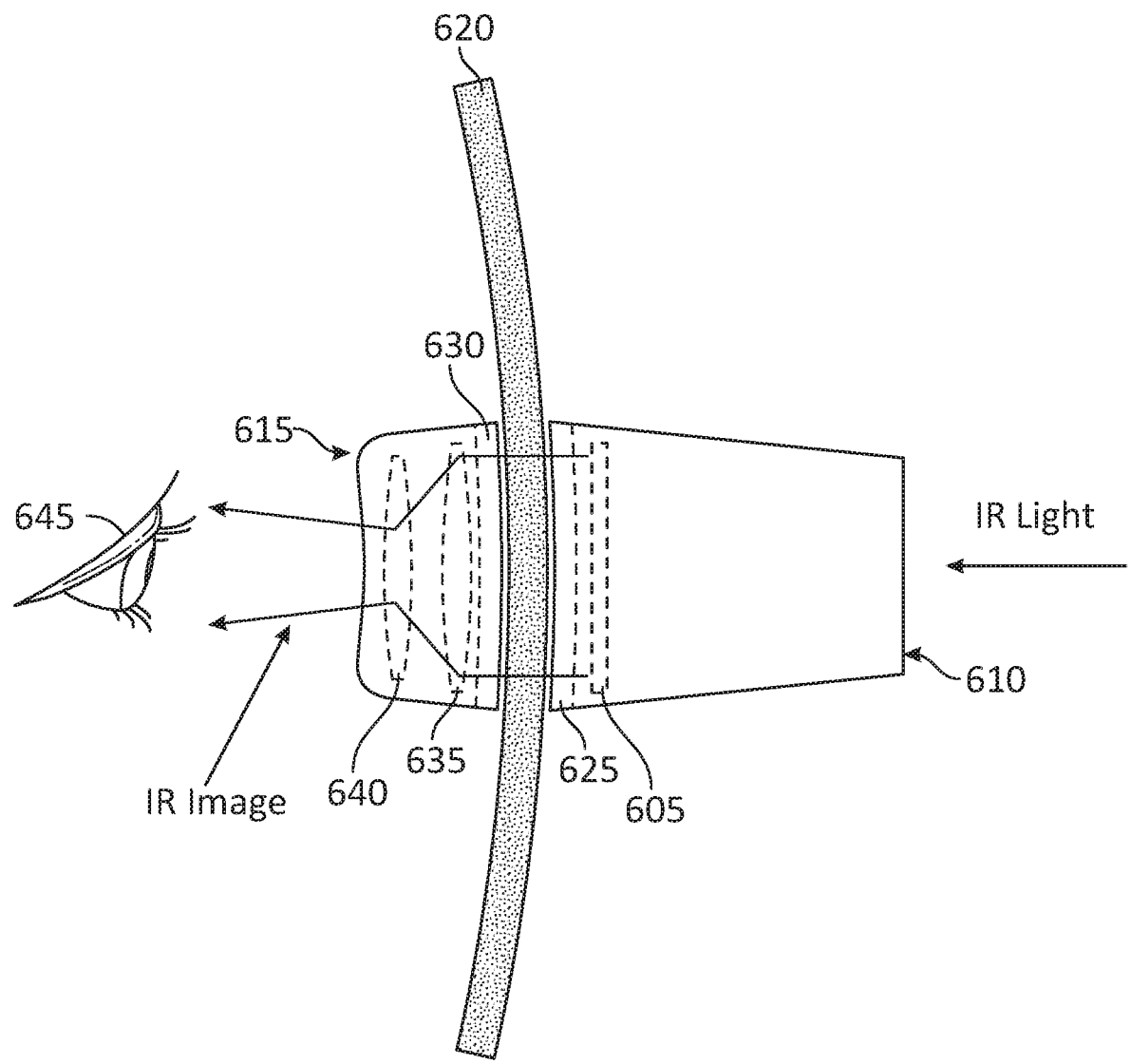
FIG. 6 illustrates a display component of an attachment aligned to an optical relay component in accordance with one or more embodiments of the present disclosure.

FIG. 6 illustrates a display component 605 of an attachment 610 aligned to an optical relay component 615 in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein.

Additional components, different components, and/or fewer components may be provided. In an embodiment, the foregoing description pertaining to wearable apparatuses, attachments, and optical relay components generally applies corresponding structures of FIG. 6.

The attachment 610 and the optical relay component 615 are divided by a shield 620 of a wearable apparatus. A mechanical interface 625 (e.g., one or more engagement elements) may securely couple the attachment 610 to an exterior surface of the shield 620. A mechanical interface 630 (e.g., one or more engagement elements) may securely couple the optical relay component 615 to an interior surface of the shield 620. By way of non-limiting examples, the mechanical interface 625 and the mechanical interface 630 may include one or more of metal, magnets, adhesives (e.g., glue, tape), screws, bolts, pop rivets, bumps and ridges, suction cups, and/or other fastener and/or fastening structure. In one particular example, the mechanical interface 625 may include a first magnet to couple the attachment 610 to the exterior surface of the shield 620 and the mechanical interface 630 may include a second magnet to couple the optical relay component 615 to the interior surface of the shield 620. The first magnet and the second magnet may be appropriately positioned such that the first and second magnets attract each other, in which such magnetic attraction may maintain alignment between the display component 605 and the optical relay component 615.

The attachment 610 may include one or more imaging sensors to capture IR light and generate images based on the captured light. The display component 605 may receive the generated images and provide (e.g., mirror, couple, project) the images to the optical relay component 615. The optical relay component 615 includes optical lenses 635 and 640 to receive the images from the display component 605 and provide the images to a user/viewer 645 (e.g., eyes of the user 645).

Figure 7:
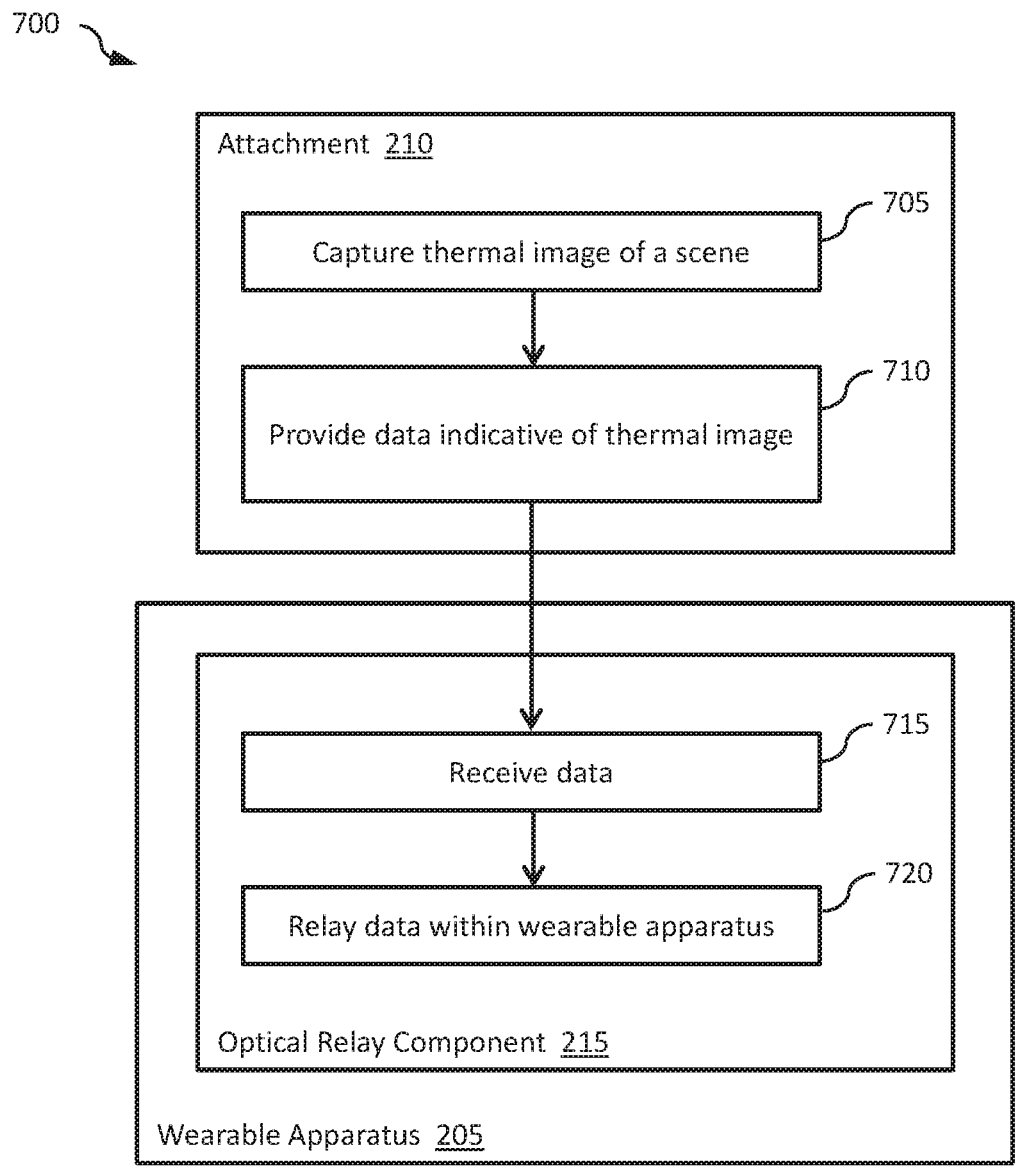
FIG. 7 illustrates a flow diagram of an example process for facilitating image relay for a wearable apparatus in accordance with one or more embodiments of the disclosure.

FIG. 7 illustrates a flow diagram of an example process 700 for facilitating image relay for a wearable apparatus in accordance with one or more embodiments of the disclosure. For explanatory purposes, the example process 700 is described herein with reference to the system 200 of FIG. 2. However, the example process 700 is not limited to FIG. 2.

At block 705, the imaging capture component 250 of the attachment 210 captures an image of a scene (e.g., the external environment 225). The image may be a thermal image. At block 710, the display component 260 provides data indicative of the image. The data may be a user-viewable thermal image. In some cases, the user-viewable thermal image may be generated by the processing component 255 of the attachment 210. The user-viewable thermal image may provide a visible-light representation of the image, which captures IR radiation of the scene.

At block 715, the optical relay component 215 of the wearable apparatus 205 receives the data from the display component 260. At block 720, the optical relay component 215 relays the data within the wearable apparatus 205 to the user 220. In some aspects, the optical relay component 215 may include one or more optical elements (e.g., lenses, prisms, mirrors, light tube, fiber optic, waveguide) appropriately arranged to receive the data from the display component 260 and provide the data to the user 220.

Figure 8:
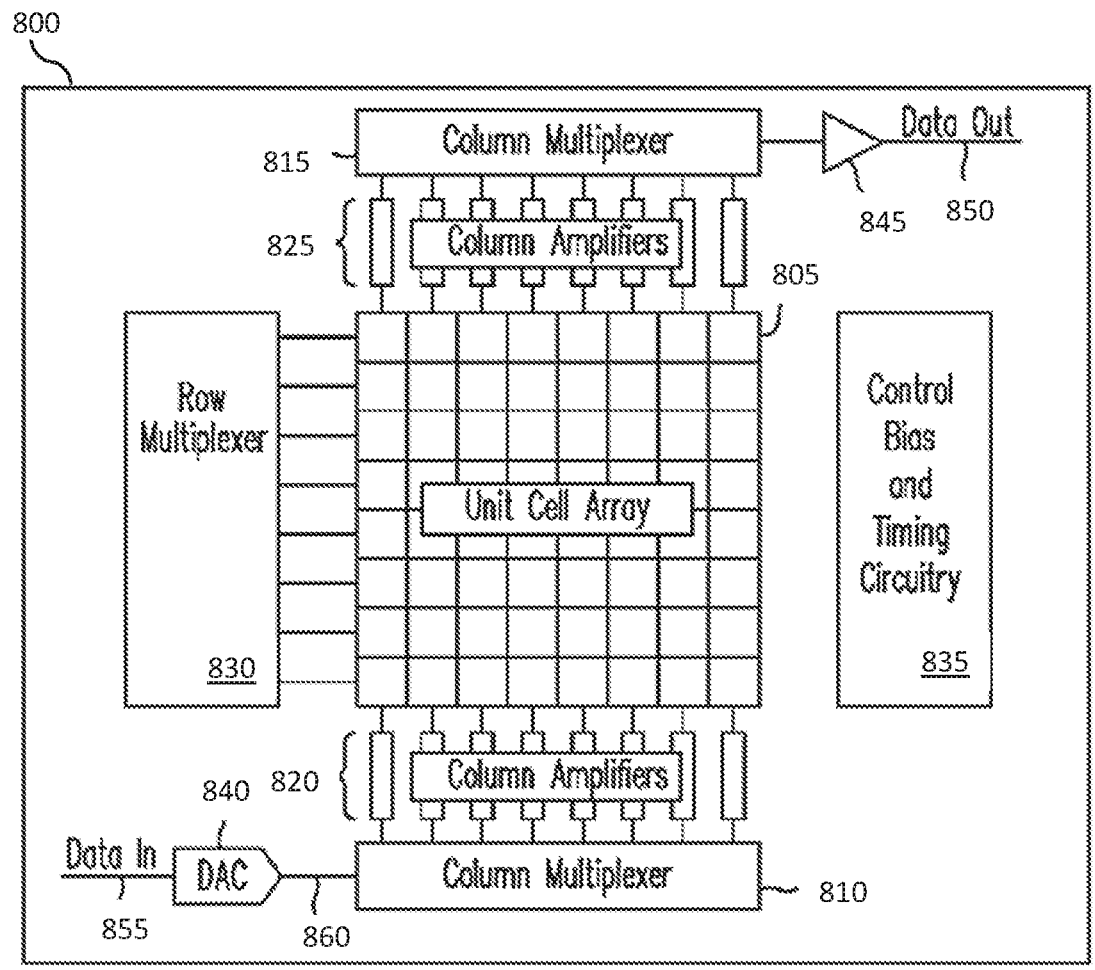
FIG. 8 illustrates a block diagram of an example image sensor assembly in accordance with one or more embodiments of the present disclosure.

FIG. 8 illustrates a block diagram of an example image sensor assembly 800 in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. In an embodiment, the image sensor assembly 200 may be an FPA, for example, implemented as the image capture component 115 of FIG. 1.

The image sensor assembly 800 includes a unit cell array 805, column multiplexers 810 and 815, column amplifiers 820 and 825, a row multiplexer 830, control bias and timing circuitry 835, a digital-to-analog converter (DAC) 840, and a data output buffer 845. The unit cell array 805 includes an array of unit cells. In an aspect, each unit cell may include a detector and interface circuitry. The interface circuitry of each unit cell may provide an output signal, such as an output voltage or an output current, in response to a detector signal (e.g., detector current, detector voltage) provided by the detector of the unit cell. The output signal may be indicative of the magnitude of EM radiation received by the detector. The column multiplexer 815, column amplifiers 820, row multiplexer 830, and data output buffer 845 may be used to provide the output signals from the unit cell array 805 as a data output signal on a data output line 850. The output signals on the data output line 850 may be provided to components downstream of the image sensor assembly 800, such as processing circuitry (e.g., the processing component 105 of FIG. 1), memory (e.g., the memory component 110 of FIG. 1), display device (e.g., the display component 130 of FIG. 1), and/or other component to facilitate processing, storage, and/or display of the output signals. The data output signal may be an image formed of the pixel values for the image sensor assembly 800. In this regard, the column multiplexer 815, the column amplifiers 820, the row multiplexer 830, and the data output buffer 845 may collectively provide an ROIC (or portion thereof) of the image sensor assembly 800. In an embodiment, components of the image sensor assembly 800 may be implemented such that the unit cell array 805 is hybridized to (e.g., bonded to, joined to, mated to) the ROIC.

The column amplifiers 825 may generally represent any column processing circuitry as appropriate for a given application (analog and/or digital), and is not limited to amplifier circuitry for analog signals. In this regard, the column amplifiers 825 may more generally be referred to as column processors in such an aspect. Signals received by the column amplifiers 825, such as analog signals on an analog bus and/or digital signals on a digital bus, may be processed according to the analog or digital nature of the signal. As an example, the column amplifiers 825 may include circuitry for processing digital signals. As another example, the column amplifiers 825 may be a path (e.g., no processing)

through which digital signals from the unit cell array 805 traverses to get to the column multiplexer 815. As another example, the column amplifiers 825 may include an ADC for converting analog signals to digital signals (e.g., to obtain digital count values). These digital signals may be provided to the column multiplexer 815.

Each unit cell may receive a bias signal (e.g., bias voltage, bias current) to bias the detector of the unit cell to compensate for different response characteristics of the unit cell attributable to, for example, variations in temperature, manufacturing variances, and/or other factors. For example, the control bias and timing circuitry 835 may generate the bias signals and provide them to the unit cells. By providing appropriate bias signals to each unit cell, the unit cell array 805 may be effectively calibrated to provide accurate image data in response to light (e.g., IR light) incident on the detectors of the unit cells.

In an aspect, the control bias and timing circuitry 835 may generate bias values, timing control voltages, and switch control voltages. In some cases, the DAC 840 may convert the bias values received as, or as part of, data input signal on a data input signal line 855 into bias signals (e.g., analog signals on analog signal line(s) 860) that may be provided to individual unit cells through the operation of the column multiplexer 810, column amplifiers 820, and row multiplexer 830. In another aspect, the control bias and timing circuitry 835 may generate the bias signals (e.g., analog signals) and provide the bias signals to the unit cells without utilizing the DAC 840. In this regard, some implementations do not include the DAC 840, data input signal line 855, and/or analog signal line(s) 860. In an embodiment, the control bias and timing circuitry 835 may be, may include, may be a part of, or may otherwise be coupled to the processing component 105 and/or imaging capture component 115 of FIG. 1.

In an embodiment, the image sensor assembly 800 may be implemented as part of an imaging system (e.g., 100). In addition to the various components of the image sensor assembly 800, the imaging system may also include one or more processors, memories, logic, displays, interfaces, optics (e.g., lenses, mirrors, beamsplitters), and/or other components as may be appropriate in various implementations. In an aspect, the data output signal on the data output line 850 may be provided to the processors (not shown) for further processing. For example, the data output signal may be an image formed of the pixel values from the unit cells of the image sensor assembly 800. The processors may perform operations such as non-uniformity correction (NUC), spatial and/or temporal filtering, and/or other operations. The images (e.g., processed images) may be stored in memory (e.g., external to or local to the imaging system) and/or displayed on a display device (e.g., external to and/or integrated with the imaging system).

By way of non-limiting examples, the unit cell array 805 may include 512×512 (e.g., 512 rows and 512 columns of unit cells), 1024×1024, 2048×2048, 4096×4096, 8192× 8192, and/or other array sizes. In some cases, the array size may have a row size (e.g., number of detectors in a row) different from a column size (e.g., number of detectors in a column). Examples of frame rates may include 30 Hz, 60 Hz, and 120 Hz. In an aspect, each unit cell of the unit cell array 805 may represent a pixel.

Terms such as "top", "bottom", "front", "rear", "side", "horizontal", "vertical", and the like refer to an arbitrary frame of reference, rather than to the ordinary gravitational frame of reference. Thus, such a term may extend upwardly, downwardly, diagonally, or horizontally in a gravitational frame of reference.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

The foregoing description is not intended to limit the present disclosure to the precise forms or particular fields of use disclosed. Embodiments described above illustrate but do not limit the disclosure. It is contemplated that various alternate embodiments and/or modifications to the present disclosure, whether explicitly described or implied herein, are possible in light of the disclosure. Accordingly, the scope of the present disclosure is defined only by the following claims.

What is claimed is:

1. A system comprising:
   an attachment configured to releasably couple to an exterior surface of a wearable apparatus, the attachment comprising:
   an infrared sensor assembly configured to capture a thermal image of a scene; and
   a display component configured to provide data indicative of the thermal image; and
   an optical relay component configured to:
   couple to an interior surface of the wearable apparatus;
   receive the data from the display component; and
   relay the data within the wearable apparatus to facilitate presenting the data for viewing by a user while wearing the wearable apparatus, wherein a position of the optical relay component relative to a position of the attachment is adjustable.

2. The system of claim 1, wherein the attachment further comprises a processing component configured to generate a user-viewable image based on the thermal image, wherein the data comprises the user-viewable image, and wherein a position of the interior surface of the wearable apparatus at which the optical relay component is configured to couple is user-adjustable.

3. The system of claim 1, wherein the display component is configured to provide the data through a shield of the wearable apparatus and to the optical relay component.

4. The system of claim 3, wherein the display component comprises a projector configured to project the data through the shield of the wearable apparatus and to the optical relay component.

5. The system of claim 1, wherein the optical relay component is configured to releasably couple to the interior surface of the wearable apparatus.

6. The system of claim 1, wherein the attachment further comprises a housing, and wherein the infrared sensor assembly is at least partially within the housing.

7. The system of claim 1, wherein the attachment further comprises one or more engagement elements configured to releasably couple to the exterior surface of the wearable apparatus, wherein the optical relay component comprises a housing and one or more optical elements at least partially enclosed in the housing, and wherein the housing is coupled to the wearable apparatus.

8. The system of claim 1, further comprising:
a first magnet configured to couple the attachment to the wearable apparatus; and
a second magnet configured to couple the optical relay component to the wearable apparatus and configured to be aligned with the first magnet,
wherein the first magnet and the second magnet are collectively configured to facilitate alignment between the attachment and the optical relay component.

9. The system of claim 1, wherein the display component is configured to be adjacent to and face the optical relay component, and wherein the display component and the optical relay component are configured to be positioned on opposite surfaces of a shield of the wearable apparatus.

10. The system of claim 1, wherein the optical relay component comprises a plurality of optical elements.

11. The system of claim 1, further comprising the wearable apparatus.

12. The system of claim 11, wherein the wearable apparatus comprises a shield configured to protect at least a portion of the user's face from the scene, wherein the position of the optical relay component and the position of the attachment are adjustable, and wherein the optical relay component and the attachment are aligned.

13. The system of claim 12, wherein the shield is further configured to pass at least some visible light from the scene to the user for viewing the scene through the shield.

14. The system of claim 12, wherein the wearable apparatus is a self-contained breathing apparatus, and wherein the wearable apparatus further comprises a mask frame sealingly coupled to the shield.

15. A method of constructing the system of claim 11, the method comprising:
releasably coupling the attachment to the exterior surface of the wearable apparatus using one or more first engagement elements; and
coupling the optical relay component to the interior surface of the wearable apparatus using one or more second engagement elements.

16. The method of claim 15, wherein the optical relay component is releasably coupled to the interior surface of the wearable apparatus.

17. A method comprising:
capturing, by an infrared sensor assembly of an attachment that is releasably coupled to an exterior of a wearable apparatus, a thermal image of a scene;
providing, by a display component of the attachment, data indicative of the thermal image into the wearable apparatus;
receiving, by an optical relay component coupled to an interior surface of the wearable apparatus, the data, wherein a position of the optical relay component relative to a position of the attachment is adjustable; and
relaying, by the optical relay component, the data within the wearable apparatus to facilitate presenting the data for viewing by a user while wearing the wearable apparatus.

18. The method of claim 17, further comprising generating, by a processing component of the attachment, a user-viewable image based on the thermal image, wherein the data comprises the user-viewable image.

19. The method of claim 17, wherein the providing comprises providing the data through a shield of the wearable apparatus and to the optical relay component, and wherein a direction at which the display component provides the data is adjustable.

20. The method of claim 17, wherein the display component is adjacent to and faces the optical relay component, and wherein the display component and the optical relay component are positioned on opposite surfaces of a shield of the wearable apparatus.

* * * * *